United States Patent [19]

Schmidt et al.

[11] Patent Number: 4,970,257

[45] Date of Patent: Nov. 13, 1990

[54] SELF-EXTINGUISHING, HALOGEN-FREE THERMOPLASTIC MOLDING COMPOUNDS

[75] Inventors: Friedrich G. Schmidt, Muenster; Horst Beyer, Marl; Hans Jadamus, Marl, all of Fed. Rep. of Germany

[73] Assignee: Huels AG, Marl, Fed. Rep. of Germany

[21] Appl. No.: 466,610

[22] Filed: Jan. 17, 1990

[30] Foreign Application Priority Data

Feb. 13, 1989 [DE] Fed. Rep. of Germany ....... 3904207

[51] Int. Cl.$^5$ .............................................. C08K 5/01
[52] U.S. Cl. ..................................... 524/486; 524/606
[58] Field of Search ................................ 524/486, 606

[56] References Cited

U.S. PATENT DOCUMENTS

| | | | |
|---|---|---|---|
| 3,011,990 | 12/1961 | Roh et al. | 524/486 |
| 3,361,851 | 1/1968 | Gowan | 524/508 |
| 3,437,627 | 4/1969 | Gude et al. | 524/486 |
| 4,104,244 | 8/1978 | Chuchin et al. | 524/486 |
| 4,203,931 | 5/1980 | Lee | 524/411 |
| 4,286,071 | 8/1981 | Rigler | 524/486 |

FOREIGN PATENT DOCUMENTS 2906336 8/1980 Fed. Rep. of Germany .
1073937 6/1967 United Kingdom .

*Primary Examiner*—Veronica P. Hoke
*Attorney, Agent, or Firm*—Oblon, Spivak, McClelland, Maier & Neustadt

[57] ABSTRACT

Molding compounds based on polyphenylene ethers, which are distinguished by reduced combustibility and good processing properties. The molding masses contain (A) 100 parts by weight polyphenylene ether, (B) 1 to 40 parts by weight of a dibenzyl toluene and, relative to the total weight of the molding compound, (C) 0 to 30% reinforcing material, and (D) 0 to 5% additives. The molding compounds are used for the production of technical articles such as pipes, plates and housings.

9 Claims, No Drawings

SELF-EXTINGUISHING, HALOGEN-FREE THERMOPLASTIC MOLDING COMPOUNDS

BACKGROUND OF THE INVENTION

1. Field of the Invention:

The invention concerns self-extinguishing thermoplastic molding compounds (compositions) which contain polyphenylene ethers as their main component.

2. Discussion of the Background:

Polyphenylene ethers are polymers with good thermal and electrical properties. Poly(2,6-dimethyl,1,4-phenylene ether) (PPE) has achieved technical significance.

Pure PPE is difficult to process due to its high melt viscosity, but results in molded parts with high shape retention under heat. However, they are not very impact-resistant, especially in the areas having external notches.

There have been numerous attempts to improve the processing properties and notch impact resistance of the molding masses (see DE-PS 16 94 255 corresponding to U.S. Pat. No. 3,361,851, DE-PS 16 94 257 corresponding to U.S. Pat. No. 3,383,435 and DE-PS 16 95 290 corresponding to U.S. Pat. No. 3,379,792). However, it has been shown that adding polyolefins, polystyrenes and polyamides does not influence the property profile of molding materials containing PPE in an optimal way.

Mixtures of polyphenylene ethers with impact-resistant polystyrenes have achieved greater technical significance (see DE-PS 21 19 301 and DE-PS 22 11 005). Since the addition of polystyrene improves the melt flow, these mixtures can be easily processed to yield molded parts with sufficient impact resistance, but have the disadvantage that with an increasing polystyrene content, the flammability increases, and at the same time, the shape retention under heat decreases.

In order to reduce the flammability of the molding compounds containing PPE, various flame retardant agents are used. Suitable substances have proven to be aromatic phosphorus compounds such as triphenyl phosphate, diphenyl cresyl phosphate and/or diphenyl isopropylphenyl phosphate and others, for example, which also serve as a processing aid. Processing at higher temperatures, however, causes unpleasant odors, and harmful physiological effects of the aromatic phosphorus compounds or their decomposition products, respectively, cannot be eliminated.

It is known that halogen containing substances can be used as flame retardant agents. Possible substances are, for example, organic compounds such as those described in the monograph by H. Vogel, "Flammfestmachen von Kunststoff", Huethig-Verlag, 1966, on pages 94 to 102. Halogenated polymers, such as halogenated polyphenylene ethers, for example (e g DE-PS 33 34 068), especially brominated polyphenylene ethers or brominated oligostyrenes or polystyrenes with preferably more than 30 % by weight halogen are used as flame retardants. If flame retardant agents which contain halogens are used, it is recommended that compounds of antimony, boron or tin be added in amounts from 0.5 to 10 % by weight, relative to the thermoplastic resin, in order to increase the effect of flame retardancy.

A serious disadvantage of all organic compounds which contain halogens is that highly corrosive and toxic hydrogen chloride or hydrogen bromide gas is formed during fires.

DE-OS 29 06 336 describes the use of special hydrocarbons as synergists for organic halogen compounds, especially bromine compounds, for providing flame protection of expandable suspension polystyrene. Suitable hydrocarbons are, e.g., benzyl toluene and dibenzyl toluene, also in the form of the isomer mixtures. In addition to 0.1-3 % by weight of the hydrocarbon, halogen compounds are used in such an amount that the halogen content is 0.1-2 % by weight relative to the styrene polymer. In a preferred embodiment, 0.01-0.08 % by weight of organic peroxides are present, in addition, which have a half life period of more than 2 hours at 100° C. Such molding compounds are only suitable for the production of foam polystyrene with flame retardant properties and demonstrate the disadvantages stated above, because of the unavoidable halogen content.

SUMMARY OF THE INVENTION

Accordingly, one object of the present invention is to provide self-extinguishing, halogen-free thermoplastic molding compounds having excellent flammability resistance, on the one hand, and which can be used without reservations concerning their toxicity. The processing properties of the molding compounds should not be detrimentally affected.

Thermoplastic molding compounds have now been discovered which meet these requirements. They contain:

(A) 100 parts by weight polyphenylene ethers,
(B) 1 to 40 parts by weight dibenzyl toluenes and, relative to the total molding compound,
(C) 0 to 30% conventional reinforcing materials, and
(D) 0 to 5% conventional additives.

DESCRIPTION OF THE PREFERRED EMBODIMENTS

Thermoplastic molding compounds within the scope of this invention are considered to be unmolded mixtures which can be processed into molded parts or semi-finished products by thermoplastic processing. The thermoplastic compounds can be present in the form of a granulate, for example.

Possible polyphenylene ethers A are, preferably, polyphenylene ethers based on 2,6-dimethyl phenol, with the ether oxygen of the one unit being bonded with the benzene nucleus of the adjacent unit. At least 50 units should be connected with one another.

In addition, other o,o'-dialkyl phenols may also be used to prepare the polyphenylene ethers, as long as the alkyl group does not contain a tertiary carbon atom in the alpha-position. Preferred phenols contain $C_{1-6}$ alkyl groups. Any one of the monomer phenols mentioned can be substituted with a methyl group in the 3-position, optionally also in the 5-position. Of course, mixtures of the monomer phenols mentioned here can also be used.

The polyphenylene ethers can be produced from the phenols in the presence of copper-amine complexes such as copper bromide and morpholine, for example (see DE-OS 32 24 692 and OS 32 24 691). The viscosity numbers, determined according to DIN 53 728 in chloroform at 25° C., are in the range of 35 to 80 ml/g. Polymers of 2,6-dimethyl phenol, i.e., poly-(2,6-dimethyl-1,4-phenyl ether), with a viscosity number of 40 to 70 ml/g (J value according to DIN 53 728), are preferred. The polyphenylene ethers are usually used in the form of a powder or granulate.

Suitable dibenzyl toluenes have the general formula

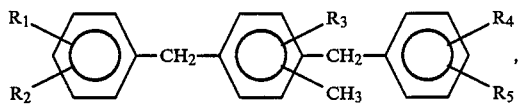

with the groups $R_1$ to $R_5$ representing hydrogen atoms, $C_{1-8}$ alkyl groups, $C_{5-6}$ cycloalkyl groups or $C_{6-10}$ aryl groups, independently of one another. The dibenzyl toluenes can be obtained according to the method described in the German patent 10 85 877, for example Generally they are present as isomer mixtures, which can be used in this form. Such an isomer mixture is commercially available under the trade name of MARLOTHERM ® S (manufacturer: HUELS AG, D-4370 Marl).

Any conventional reinforcing materials, for example, fibers may be used. Fiberglass and carbon fibers are particularly preferred as reinforcing material C.

The thermoplastic molding compounds according to the invention can also contain additives D, such as pigments, oligomers, anti-static agents, stabilizers and processing aids. Suitable stabilizers include organic phosphites, such as didecyl phenyl phosphite and trilauryl phosphite, sterically hindered phenols, derivatives of tetramethyl piperidine, benzophenone and triazole, as well as stabilizers based on sterically hindered amines, so-called HALS compounds. Waxes, such as oxidized hydrocarbons, for example, as well as their alkali and alkaline earth metal salts, are suitable as processing aids.

The proportion of reinforcing material can be up to 30% and that of all other additives up to a total of 5%, always with reference to the weight of the entire molding compound.

The individual components may be mixed in the melt in known manner, both by batch operation and continuously.

Conventional equipment for handling of highly viscous melts is suitable for melting and mixing. Twin-screw extruders and co-extruders are particularly suitable.

The molding compounds according to the invention not only possess reduced combustibility; they are also easier to process, due to an increasing content of dibenzyl toluenes. Surprisingly, mixing in even small amounts of dibenzyl toluene also clearly increases the modulus of elasticity, i.e. the rigidity.

The molding compounds obtained can be processed into molded parts using the conventional methods for thermoplastics processing, such as injection molding and extrusion. Examples of technical areas of application are pipes, plates, housings and other articles for the automotive, electrical and precision mechanics sector.

Other features of the invention will become apparent in the course of the following descriptions of exemplary embodiments which are given for illustration of the invention and are not intended to be limiting thereof.

EXAMPLES

Poly-(2,6-dimethyl-1,4-phenyl ether) with a J value of 68 ml/g was obtained by oxidative coupling of 2,6-dimethyl phenol, stopping the reaction, and subsequent reaction extraction according to DE-OS 33 13 864 and OS 33 23 777. The solvent was removed by evaporation and the melt was extruded through a degasification extruder and then granulated.

The dibenzyl toluene used was MARLOTHERM ® S from the company Huels AG, D-4370 Marl. The properties of this product are described in the brochure "MARLOTHERM ® S," No. 1050/November 1987, of Huels AG.

The mixtures were produced on a twin-screw extruder ZSK 30M9/2 from the company Werner & Pfleiderer, at temperatures between 260° and 290° C., with an average duration of compounding of approximately 3 minutes. The MARLOTHERM ® S was metered into the polyphenylene ether melt as a liquid. After granulation and drying, the products were processed to form test elements, by injection molding. The modulus of elasticity (tensile test) was determined according to DIN 53 457, the Vicat softening temperature was determined according to Method B of DIN 53 460, and the melt index (MVI) was determined according to DIN 53 735, at a temperature of 300° C. and a load of 10 kg. The combustion behavior, taking into consideration dripping of the melted material, was evaluated according to the UL 94 test of Underwriters Laboratories Inc. (January 1980 version)

|  | A | 1 | 2 | 3 | 4 |
|---|---|---|---|---|---|
| Composition of the examples |  |  |  |  |  |
| polyphenylene ether | 100 | 94.4 | 90.5 | 89.1 | 84.1 |
| MARLOTHERM ® S | — | 5.6 | 9.5 | 10.9 | 15.9 |
| Properties of the molding compounds |  |  |  |  |  |
| MVI ($cm^3$/10 min) 10 kg/300° C. DIN 53 735 | <3 | 15 | 36 | 49 | 142 |
| Vicat softening temperature Method B (°C.) DIN 53 460 | 204 | 175 | 155 | 146 | 117 |
| classification according to UL 94 3.2 mm | no classification | V-O | V-O | V-O | V-O |
| total burning period of 5 test elements (1st + 2nd flame exposure) (sec) | 127 | 43 | 13 | 33 | 29 |
| modulus of elasticity (tensile test, $N/mm^2$) DIN 53 457 | 2,500 | 2,810 | 2,910 | 2,800 | 2,880 |

As is evident from the experimental values, the combustibility of the molding compounds according to the invention is greatly reduced by mixing with the dibenzyl toluene isomer mixture. In addition, the melt flow increases greatly with an increasing dibenzyl toluene content. In other words the processing properties improve; however, this gain is at the expense of a lowered Vicat softening temperature. Surprisingly, however, the modulus of elasticity is also clearly increased by mixing with the dibenzyl toluenes.

Obviously, numerous modifications and variations of the present invention are possible in light of the above teachings. Accordingly, it is to be understood that within the scope of the appended claims, the invention may be practiced otherwise than as specifically described herein.

What is claimed as new and desired to be secured by letters patent of the United States is:

1. A self-extinguishing, halogen-free thermoplastic molding compound, comprising:
(A) 100 parts by weight polyphenylene ether (B) 1 to 40 parts by weight of a dibenzyl toluene and, relative to the total weight of the molding compound, (C) 0 to 30% reinforcing material, and (D) 0 to 5% conventional additives selected from the group consisting of pigments, oligomeric flame retardants, anti-static agents, stabilizers and processing aids.

2. The thermoplastic molding compound of claim 1, wherein said polyphenylene ether is a polymer of a o,o'-dialkyl phenol wherein said dialkyl phenol does not contain a tertiary carbon atom in the alkyl group at the alpha-position of the o,o'-dialkyl phenol.

3. The thermoplastic molding compound of claim 2, wherein the alkyl groups of said dialkyl phenol contain 1-6 carbon atoms.

4. The thermoplastic molding compound of claim 3, wherein said dialkyl phenol is 2,6-dimethyl phenol.

5. The thermoplastic molding compound of claim 1, wherein said polyphenylene ether is a polymer of 2,6-dimethyl phenol having a viscosity number J of 40 lo 70 ml/g.

6. The thermoplastic molding compound of claim 1, wherein said polyphenylene ether has a viscosity number J of 35–80 ml/g determined in chloroform at 25° C.

7. The thermoplastic molding compound of claim 1, wherein said dibenzyl toluene has the formula

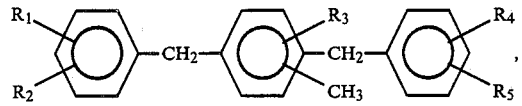

wherein $R_1$, $R_2$, $R_3$, $R_4$ and $R_5$ are, independently, hydrogen, $C_{1-8}$ alkyl, $C_{5-6}$ cycloalkyl or $C_{6-10}$ aryl.

8. The thermoplastic molding compound of claim 1, containing a mixture of dibenzyl toluenes.

9. The thermoplastic molding compound of claim 1, wherein said reinforcing material is fiberglass or carbon fibers.

* * * * *